(12) United States Patent
Sodan et al.

(10) Patent No.: US 10,598,522 B2
(45) Date of Patent: Mar. 24, 2020

(54) SENSOR DEVICE

(71) Applicant: Robert Bosch GmbH, Stuttgart (DE)

(72) Inventors: Lars Sodan, Balingen (DE); Ronny Schmid, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 15/544,332

(22) PCT Filed: Jan. 27, 2016

(86) PCT No.: PCT/EP2016/051624
§ 371 (c)(1),
(2) Date: Jul. 18, 2017

(87) PCT Pub. No.: WO2016/131617
PCT Pub. Date: Aug. 25, 2016

(65) Prior Publication Data
US 2018/0266855 A1    Sep. 20, 2018

(30) Foreign Application Priority Data

Feb. 17, 2015 (DE) .......... 10 2015 202 780

(51) Int. Cl.
| | |
|---|---|
| *G01D 11/24* | (2006.01) |
| *E01F 11/00* | (2006.01) |
| *G01D 11/30* | (2006.01) |
| *G01D 21/02* | (2006.01) |
| *G08G 1/02* | (2006.01) |
| *G08G 1/14* | (2006.01) |

(52) U.S. Cl.
CPC ............ *G01D 11/245* (2013.01); *E01F 11/00* (2013.01); *G01D 11/30* (2013.01); *G01D 21/02* (2013.01); *G08G 1/02* (2013.01); *G08G 1/146* (2013.01)

(58) Field of Classification Search
CPC ....... E01F 11/00; G01D 11/245; G01D 11/30; G01D 21/02; G08G 1/02; G08G 1/146
See application file for complete search history.

(56) References Cited

U.S. PATENT DOCUMENTS

| 3,911,390 A | * | 10/1975 | Myers ............... E01F 11/00 |
| | | | 174/115 |
| 5,008,666 A | * | 4/1991 | Gebert ............... G08G 1/02 |
| | | | 340/933 |
| 5,206,642 A | * | 4/1993 | Gregoire ............. G08G 1/02 |
| | | | 174/110 A |

(Continued)

FOREIGN PATENT DOCUMENTS

| EP | 0259523 A1 | 3/1988 |
| FR | 2969281 A1 | 6/2012 |

(Continued)

OTHER PUBLICATIONS

International Search Report dated Mar. 22, 2016, of the corresponding International Application PCT/EP2016/051624 filed Jan. 27, 2016.

*Primary Examiner* — Francis C Gray
(74) *Attorney, Agent, or Firm* — Norton Rose Fulbright US LLP; Gerard Messina

(57) ABSTRACT

A sensor device including a sensor casing, within which one or multiple sensors is/are situated and a mounting, the mounting being fastened to a traffic infrastructure and the sensor casing being detachably fastened in the mounting.

17 Claims, 1 Drawing Sheet

(56) References Cited

U.S. PATENT DOCUMENTS

| | | | |
|---|---|---|---|
| 5,239,148 A * | 8/1993 | Reed | G08G 1/02 200/86 A |
| 5,710,558 A * | 1/1998 | Gibson | G08G 1/02 200/85 R |
| 5,757,288 A * | 5/1998 | Dixon | G08G 1/042 340/933 |
| 5,850,192 A * | 12/1998 | Turk | G01V 3/00 340/933 |
| 2008/0271907 A1* | 11/2008 | Allen | G08G 1/02 174/50 |
| 2011/0011180 A1* | 1/2011 | Wilson | G01D 11/245 73/431 |
| 2012/0007749 A1* | 1/2012 | Oldknow | G08G 1/017 340/933 |
| 2012/0293339 A1 | 11/2012 | Milon et al. | |
| 2013/0025115 A1 | 1/2013 | Stormbom | |
| 2013/0220033 A1* | 8/2013 | Weston | G01L 1/04 73/862.625 |
| 2014/0098631 A1* | 4/2014 | Pichot | G01V 1/16 367/14 |
| 2014/0266800 A1* | 9/2014 | Koukoumidis | G08G 1/141 340/932.2 |
| 2014/0375206 A1* | 12/2014 | Holland | H02J 9/061 315/86 |
| 2015/0279209 A1* | 10/2015 | Borton | G08G 1/01 377/9 |
| 2016/0076207 A1* | 3/2016 | Moran | E01F 9/30 340/905 |
| 2016/0187183 A1* | 6/2016 | Cornu | G01G 19/024 177/132 |
| 2017/0154617 A1* | 6/2017 | Menoud | E01F 11/00 |

FOREIGN PATENT DOCUMENTS

| | | |
|---|---|---|
| JP | S593374 A | 1/1984 |
| JP | 2001236577 A | 8/2001 |
| JP | 2014153957 A | 8/2014 |
| JP | 2014241719 A | 12/2014 |
| WO | 3728519 A1 | 8/1997 |
| WO | 2006005208 A1 | 1/2006 |

* cited by examiner

SENSOR DEVICE

FIELD

The present invention relates to a sensor device.

BACKGROUND INFORMATION

Sensors are usually situated in a single-piece housing. Such a housing generally includes the entire electronics, the sensor system and electrical connections. The housing itself is then mechanically connected to a substrate.

SUMMARY

An object of the present invention is to provide an improved sensor device.

This objective may be achieved with the aid of the present invention. Advantageous embodiments of the present invention are described herein.

According to one aspect, a sensor device is provided which includes:
a sensor casing,
within which one or multiple sensor(s) are situated, and
a mounting,
the mounting being fastened to a traffic infrastructure and
the sensor casing being detachably fastened in the mounting.

Due to the fact that the sensor casing is detachably fastened in the mounting, the technical advantage is achieved in particular that the sensor casing may be exchanged without exchanging the mounting at the same time. Furthermore, it is advantageously achieved that the mounting may still be attached to the traffic infrastructure without the sensor casing. This may simplify installation or removal of the mounting. In particular, when the mounting is fastened to or removed from the particular traffic infrastructure, the sensor casing may be prevented from being damaged. This is because the sensor casing may be removed from the mounting for installation or removal. This is due to the detachable fastening.

Furthermore, this has the advantage that cost-effective installation and removal of the sensor device may be achieved. For this reason, if the sensor device is to be situated only temporarily on a traffic infrastructure, only the sensor casing may be removed after a period of use, while the mounting continues to be fastened to the traffic infrastructure. This means that the sensor casing may subsequently be reused on another mounting. Consequently, in accordance with example embodiments of the present invention, costs are generally incurred only with respect to the mounting.

According to one specific embodiment, it is provided that the mounting has only a fastening functionality. This yields, in particular, the technical advantage that a technically simple and cost-effective mounting may be used. The mounting needs only to have a fastening functionality. The fact that the mounting has exclusively a fastening functionality means, in particular, that the mounting is used exclusively for fastening the sensor casing to the traffic infrastructure and is designed accordingly. The mounting thus has no other role than a fastening role.

In an alternative embodiment, it is provided that the mounting has one or multiple additional functionalities in addition to the fastening functionality. This yields, in particular, the technical advantage that an efficient and effective utilization of the mounting may be achieved. Although only one component is provided, it has multiple functions.

In another specific embodiment, it is provided that the mounting has a communication interface which is designed for transmitting sensor data of the sensor or sensors via a communication network, so that the mounting has a communication functionality as an additional functionality. This yields, in particular, the technical advantage that the sensor data may be transmitted via a communication network, for example, to users of the communication network. Consequently, the sensor data may also be provided remote from the sensor device and, if necessary, analyzed.

According to one specific embodiment, it is provided that the sensor casing has a communication interface which is designed for transmitting sensor data of the sensor or sensors via a communication network, for example, to a server. This means, in particular, that the sensor casing has a communication functionality. This also makes it possible, in particular, to yield the technical advantage that the sensor data may be made available to users of the communication network.

In another specific embodiment, it is provided that the communication interface of the sensor casing is designed for transmitting the sensor data of the sensor or sensors to the communication interface of the mounting. This may occur, for example, via a communication network. In particular, the communication interface of the mounting is accordingly designed for receiving these sensor data of the sensor or sensors from the communication interface of the sensor casing.

This means in particular that, according to one specific embodiment, it is provided that a communication link is formed between the mounting and the sensor casing. This is in particular the case if the sensor casing is detachably fastened in the mounting. The communication link includes in particular a wireless and/or a hard-wired communication link. The communication interfaces of the sensor casing and the mounting are designed accordingly.

According to one specific embodiment, the hard-wired communication link is formed with the aid of electrical contacts.

According to one specific embodiment, a wireless communication link is formed with the aid of a coil. For example, the wireless communication link includes an NFC communication link. Here, "NFC" stands for near field communication.

According to one specific embodiment, it is provided that the wireless communication link includes an optical communication link. An optical communication link may be formed, for example, with the aid of LEDs. Here, LED stands for light emitting diode.

This means that, according to one specific embodiment, the communication interface is designed for receiving the sensor data from the sensor or sensors with the aid of an optical communication link. This means, in particular, that the sensor data are transmitted optically from the sensor casing to the mounting. The sensor casing includes, for example, one or multiple LEDs for transmitting sensor data to the mounting.

In another specific embodiment, it is provided that the mounting includes an electrical energy store for supplying the sensor or sensors with electrical energy, so that the mounting has an energy supply functionality as an additional functionality. In particular, this yields the technical advantage that the sensors or the sensor may be supplied with electrical energy. As a result, it may be possible to dispense with a separate electrical energy store in the sensor casing. If, however, such an electrical energy store is to be present in the sensor casing, the electrical energy store of the mounting may be used as a redundant electrical energy store. Thus, a redundancy with respect to an electrical energy supply of the sensor or sensors is provided.

In another specific embodiment, it is provided that the mounting includes a data memory for storing sensor data of the sensor or sensors. This yields the technical advantage, in particular, that the sensor data may be stored so that they may, for example, be made available at a later point in time. A data memory includes in particular a volatile and/or non-volatile data memory.

In another specific embodiment, it is provided that the mounting has a data memory for storing sensor data of the sensor or sensors and an electrical energy store for buffering the sensor data stored in the data memory, so that the mounting has a sensor data storage functionality and a sensor data buffering functionality as additional functionalities. This yields the technical advantage, in particular, that the sensor data may also be made available at a later point in time. Due to the sensor data buffering functionality, the data are preserved, for example, even in the event of a failure of a primary energy supply, for example, by the energy store of the sensor casing.

In another specific embodiment, it is provided that the mounting includes a detection device which is designed for detecting a number of sensor casing exchange cycles, so that the mounting has a sensor casing exchange tracking functionality as an additional functionality. This yields the technical advantage, in particular, that it is possible to track how often the sensor casing has already been exchanged.

In another specific embodiment, it is provided that the mounting includes a processor which is designed for programming the sensor or sensors, so that the mounting has a sensor programming functionality as an additional functionality. This yields the technical advantage, in particular, that the sensor or sensors may be programmed. Thus, for example, the processor may write or flash a new firmware into the sensor or sensors. As a result, for example, a sensor may be readjusted. Any errors which may have occurred in the sensor or in the sensors during the manufacture of the sensor or the sensors may thus be corrected later by software, if necessary.

In another specific embodiment, it is provided that the detachable fastening is formed with the aid of a bayonet joint and/or with the aid of a screw connection and/or with the aid of a catch mechanism and/or with the aid of clipping and/or with the aid of an adhesive bonding and/or with the aid of inserting the sensor casing into the mounting. The above-named fastening types in particular yield the technical advantage that an efficient detachable fastening of the sensor casing onto the mounting is made possible.

In another specific embodiment, it is provided that the sensor or sensors include one or multiple of the following sensors: a surroundings sensor, a parking sensor for detecting an occupancy state of a parking position, a traffic sensor for monitoring a traffic flow and/or for measuring a traffic density, and a warehouse sensor for monitoring a container assignment.

A surroundings sensor is, for example: an ultrasonic sensor, a magnetic field sensor, a LIDAR sensor, a laser sensor, a radar sensor or a video sensor or combinations of these sensors. With the aid of such a surroundings sensor, a detection of the surroundings of the sensor casing is made possible.

The parking sensor is, for example, designed as a surroundings sensor.

The traffic sensor is designed, for example, as a surroundings sensor.

The warehouse sensor is designed, for example, as a surroundings sensor.

The use of a parking sensor advantageously makes it possible to detect an occupancy state of a parking position, for example, a parking position of a parking facility. This means that a parking sensor within the meaning of the present invention is able to detect whether a parking position is occupied or not occupied, i.e., is free. According to one specific embodiment, such a sensor device is used for monitoring an occupancy state of a parking position.

When a traffic sensor is used, the sensor device may thus advantageously be used for monitoring a traffic flow and/or for measuring a traffic density, which is thus provided according to one specific embodiment.

When a warehouse sensor is used, according to one specific embodiment, the sensor device may be used for monitoring a container assignment, which is thus provided according to one specific embodiment. This may occur, for example in a warehouse for containers.

According to another specific embodiment, it is provided that the traffic infrastructure includes a parking facility, within which the mounting is fastened, or includes a road on which the mounting is fastened, or includes a container warehouse, within which the mounting is fastened.

This means, in particular that the mounting is fastened within a parking facility. Such a parking facility is a traffic infrastructure. A parking facility within the meaning of the present invention may also be referred to as a parking area and is used as an area for parking vehicles. The parking facility thus forms in particular a contiguous area which has multiple parking spaces (in the case of a parking facility on private property) or parking zones (in the case of a parking facility on public property). The parking facility may include a parking garage according to one specific embodiment. In particular, the parking facility includes a garage.

This means, in particular, that the mounting is situated or fastened, for example, on a ceiling, a wall or on a column or on a parking area or on a parking zone of a parking facility, for example, a parking garage.

In another specific embodiment, the traffic infrastructure includes a fixed or stationary object, which is situated on a road. For example, this may be a traffic sign, a light signal system, a bridge, or a tunnel.

This means, in particular, that the mounting is situated, for example, on a bridge, a tunnel, a light signal system, a lamp post, or a traffic sign. The sensor device may then be used efficiently for monitoring the traffic flow and/or for measuring a traffic density.

The mounting is situated, for example, within a warehouse. For example, the mounting is situated at a container storage facility.

According to one specific embodiment, the sensor casing includes a memory, in particular an electronic and/or magnetic memory. In particular, such a memory is a data memory for the sensor data.

According to one specific embodiment, the sensor casing includes a microcontroller for controlling the sensor or the sensors.

According to one specific embodiment, the sensor casing includes a switch for turning the sensor or sensors on or off, i.e., an on/off switch.

According to one specific embodiment, the sensor casing includes an operating element or multiple operating elements for operating the sensor or the sensors.

According to one specific embodiment, the sensor casing includes an electrical energy store for the electrical energy supply of the sensor or sensors and if necessary, for example, of additional electronic components which are situated within the sensor casing, for example, a memory and/or a microcontroller.

According to one specific embodiment, the sensor casing meets a predetermined degree of protection according to the known IP codes. The abbreviation "IP" stands for "International Protection". For the coding of the IP codes, for example, there is, for example, DIN EN 60529 or VDE 0470-1 or DIN 40050 part 9. This means, in particular, that the sensor casing encapsulates the elements situated in it against external influences and thus protects them.

According to one specific embodiment, it is provided that the mounting and/or the sensor casing include an energy transfer device, in particular a coil, for the wireless transfer of electrical energy from the sensor casing to the mounting and/or vice versa. This makes it possible, in particular, to transfer electrical energy efficiently. This means, for example, that electrical energy may, for example, be transferred inductively. In particular, the mounting and the sensor casing each include a coil for transferring and/or receiving electrical energy.

According to one specific embodiment, it is provided that the sensor casing and/or the mounting include a processor, which is designed for reading out an identification from the mounting or the sensor casing, for example, inductively, in particular with the aid of coils. For example, the identification is a location identification. A location identification means that a certain parking position is or may be identified, for example, with the aid of a number.

In one specific embodiment, the sensor casing includes a processor for activating and/or reading out the sensor or sensors.

The wording includes, in particular, the phrase "and/or".

The present invention is described in greater detail in the following based on preferred exemplary embodiments.

DETAILED DESCRIPTION OF EXAMPLE EMBODIMENTS

Figure 1:
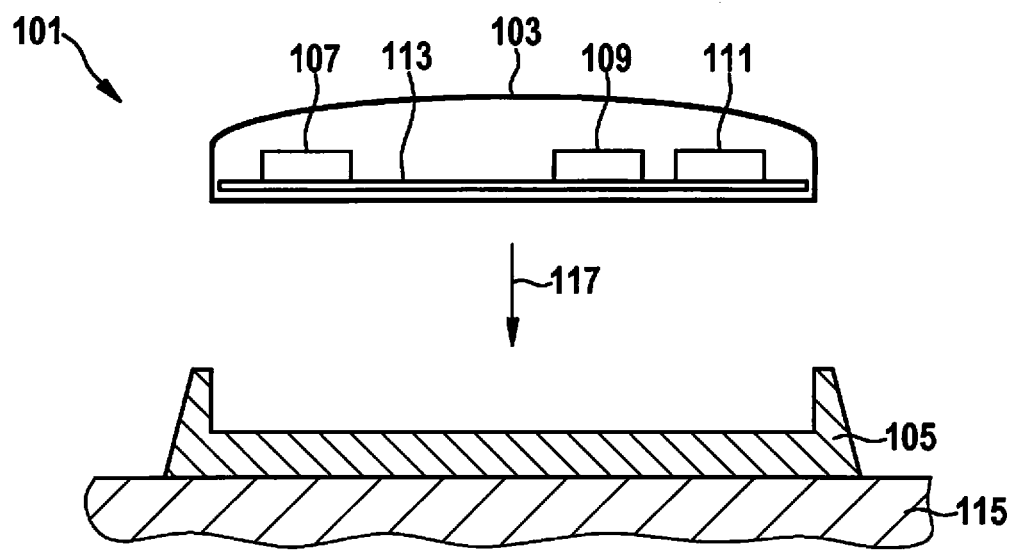
FIG. 1 shows a sensor device in the unmounted state.

FIG. 1 shows a sensor device 101 in an unmounted state. This means that a sensor casing 103 is not yet detachably fastened in a mounting 105. This means that sensor casing 103 and mounting 105 are still separate from one another.

Sensor casing 103 includes a sensor 107. In one specific embodiment, which is not shown, multiple sensors are provided which, in particular, are formed identically or, for example, differently. Sensor 107 is, for example, a surroundings sensor.

Sensor casing 103 also includes a communication interface 109. Communication interface 109 is designed for transmitting sensor data of sensor 107 via a communication network. In the case of a wireless communication link, communication interface 109 may be referred to as a radio interface.

Moreover, sensor casing 103 includes an electrical energy store 111, which may also generally be referred to as an electrical energy supply. Electrical energy store 111 supplies, for example, sensor 107 and communication interface 109 with electrical energy.

Sensor 107, communication interface 109 and electrical energy store 111 are situated on a carrier 113. Carrier 113 is, according to one specific embodiment, a circuit board. This means, in particular, that sensor 107, electrical energy store 111 and communication interface 109 may be situated on a circuit board. This yields, in particular, the technical advantage that electrical contacting and/or interconnection of the individual elements may be carried out easily and efficiently.

Electrical energy store 111, communication interface 109, sensor 107 and carrier 113 are situated within sensor casing 103. This means that sensor casing 103 encapsulates the above-named elements.

In this exemplary embodiment, mounting 105 has only one fastening functionality, because it is used exclusively for attaching sensor casing 103 indirectly onto a traffic infrastructure 115. This traffic infrastructure 115 is shown here only schematically. For example, it may be a parking facility. For example, traffic infrastructure 115 is a road or a roadway. For example, the traffic infrastructure is a light signal system, a traffic sign, a mast, a pole, a guardrail, a mount for traffic signs or information signs, a bridge or a tunnel.

Reference numeral 117 shows an arrow indicating an installation direction. This means that sensor casing 103 is inserted into mounting 105 in the direction of arrow 117.

In one specific embodiment, which is not shown, it is provided that mounting 105 has additional functionalities or an additional functionality beyond the pure fastening functionality. For example, mounting 105 has a communication functionality. For example, mounting 105 has an energy supply functionality. This means, for example, that mounting 105 includes an electrical energy store and/or a communication interface.

Figure 2:
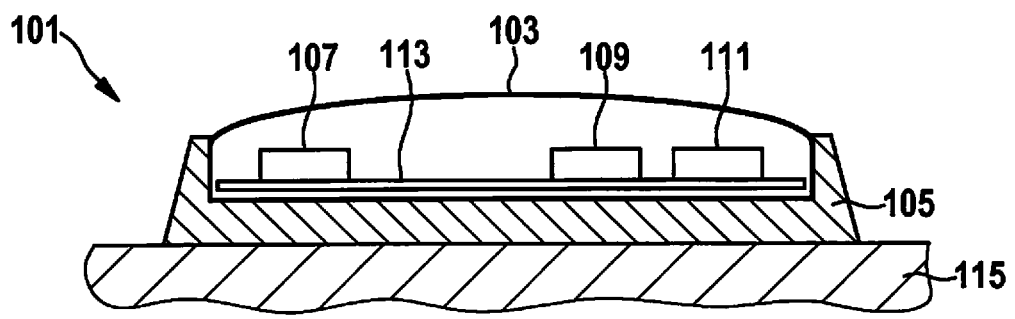
FIG. 2 shows the sensor device according to FIG. 1 in the mounted state.

FIG. 2 shows sensor device 101 in a mounted state. This means that in the mounted state, sensor casing 103 is detachably fastened to mounting 105. According to FIG. 2, sensor casing 103 in particular is inserted into mounting 105 here. In exemplary embodiments which are not shown, additional fastening possibilities are provided additionally or instead. For example, these include a bayonet joint and/or a screw connection and/or a catch mechanism and/or clipping and/or an adhesive bonding and/or a magnetic connection.

The present invention thus includes in particular and, among other things, the idea of providing at least a two-part sensor device: in this case one part is formed by the sensor casing and the other part is formed by the mounting. This means that the sensor device is at least separated into two components: a mounting and a sensor casing.

According to one specific embodiment, the mounting is designed only for fastening without further functionality.

According to one specific embodiment, the mounting includes one or multiple functionalities. For example, the mounting has a communication functionality. The sensor casing transfers sensor data to the mounting, which is then able to transmit these sensor data via a communication network with the aid of the communication interface. For example, a data transfer may be carried out via electrical contacts and/or wirelessly, for example, with the aid of a coil (NFC) and/or optically (LED). For example, the mounting does not include an electrical energy supply. This means that the mounting is free of an electrical energy store.

According to one specific embodiment, an electrical energy store is an accumulator or a battery. In particular, both a battery and an accumulator are provided.

According to one specific embodiment, the mounting includes an electrical energy store. This may, for example, assume a buffer functionality for data storage in the mounting and/or an energy supply functionality of the sensor casing.

A functionality is, for example, a location identification, which, if necessary, makes a pure sensor casing exchange possible. A location identification means that a certain parking position is or may be identified, for example, with the aid of a number. For example, a certain parking position may thus be identified within a parking facility, for example, a parking garage (for example, space number 198 in the parking garage). This means that the mounting may, for example, have a location identification functionality. This yields, for example, the technical advantage that the sensor casing may be exchanged in a simple manner without the need for again carrying out a location identification or programming.

For example, an ID programming may be omitted. "ID" stands for identification and means a location identification. This means that if the mounting has a location identification functionality, it is no longer necessary to carry out a repeated ID programming when a sensor casing is exchanged. A one-time ID programming at the time of initial installation is thus sufficient. In this case, for example, it is predefined which mounting or sensor casing has been installed at which parking position.

In particular, a functionality may include tracking of exchange cycles.

The functionality may include that storage and/or programming may be provided. For example, the programming may be carried out with the aid of a QR code, in particular with the aid of a numerical code. The storage may, for example, be implemented with the aid of RFID or a flash memory. This may be carried out, in particular, ex-factory or during initial installation.

According to one specific embodiment, the sensor casing includes the sensor system, i.e., one or multiple sensor(s), which is/are designed, for example, for detecting a parking facility occupancy, and according to another specific embodiment, an electrical energy supply (preferably one or multiple batteries), a radio interface, and according to additional specific embodiments, a data memory for the sensor data, a microcontroller, an operating element, an on/off switch.

According to specific embodiments, the detachable connection or fastening between the sensor casing and the mounting is implemented as follows in order to reliably and reversibly connect the sensor casing to the mounting: bayonet joint, screw connection, preferably with the aid of a special tool, clipping, simple insertion, adhesive bonding.

An exchange of electronics, which may be necessary (i.e., a replacement of the sensor casing) may according to the present invention, be carried out quickly, safely, economically and efficiently during ongoing operation, for example, during the ongoing operation of a parking facility, for example, a parking garage.

The electronic component, for example, the sensor component (i.e., the sensor casing), may be reused if necessary if, for example, the mounting was irreversibly connected to the substrate and/or the mounting was destroyed during removal. The same is the case if the sensor, in particular the parking sensor, has to be removed temporarily in the case of a required maintenance of the substrate (for example, the application of a new road surface), resulting in cost savings.

Furthermore, a high degree of sustainability is provided, since the sensor may be exchanged in the field, i.e., exchangeability of the sensor in the field is possible. This advantageously makes it possible to respond to, for example, a new radio standard, improvements in the sensor or in the sensors, thus in sensor elements in general, a required regionalization, or an extended function quickly and efficiently.

An individual installation, a so-called stand-alone installation, of the sensor casing alone is also provided and is possible according to one specific embodiment. An example of this is when the sensor casing is recessed or molded into the substrate. This means that, according to one specific embodiment, the sensor casing is recessed and/or molded into the substrate. Consequently, for example, the sensor casing may be molded directly into the substrate, for example, during the creation of the substrate, for example the roadway. This type of use has a high manufacturing synergy.

The sensor is, for example, a parking sensor for parking facility management. The sensor is, for example, a sensor for measuring and/or monitoring traffic flow and/or traffic density. The sensor is used, for example, for monitoring a container assignment in a container warehouse.

The present invention thus yields, in particular, the advantage of simple installation including simple removal. This is efficient and cost-effective. In particular, little specialized knowledge is needed. Thus, little specialized knowledge is required.

According to one specific embodiment, the mounting may be installed separately on a substrate. This means that, according to one specific embodiment, the mounting is installed on a substrate. One type of installation is, for example, a screw connection and/or adhesive bonding. This means that, according to one specific embodiment, the mounting is screwed and/or adhesively bonded to the traffic infrastructure, for example, to a substrate.

In particular, a simple access for installation tools is provided and thus also ensured.

In particular, extended degrees of freedom for installation are provided such as, for example, a curable adhesive or a removable mounting with the aid of action of temperature and/or UV radiation and/or increased contact pressure.

According to one specific embodiment, the sensor casing is not connected to the mounting during the installation or removal of the mounting and may not be damaged during installation or removal. This is thus a particularly robust system.

In particular, the present invention allows a cost-effective installation and installation in temporary parking spaces. In that case, the only costs incurred are for the mounting, because, for example, the sensor casing may be reused elsewhere.

Multiple specific embodiments of the mounting are provided as a function of a substrate and/or a permissible and/or possible installation type. For example, in the case of an embodiment of the mounting for an underground garage, the mounting is required to have only minimal requirements with respect to environmental influences (for example, temperature, icing). For example, the mounting is situated on a gravel surface. This is carried out, for example, with the aid of an impact nail and/or with the aid of an anchor. According to one specific embodiment, the same sensor casing may be used in both applications (underground garage and gravel surface). This therefore allows a very broad range of applications when synergy is used in the manufacturing volume of the sensor casing, which results in advantageous cost-effectiveness.

In particular, the present invention yields the advantage of simple maintenance during operation of the sensor device, because the sensor casing provides, in particular, an encapsulation of the entire electronics, sensor system and communication. This yields, for example, advantages with respect to ESD protection (ESD: electrostatic discharge, protection against electrostatic discharge), protection against moisture and icing. In particular, a controlled sealing is possible during the manufacturing process. This makes the sensor device particularly reliable. In particular, the sealing is testable and reproducible. In particular, the sensor casing may be encapsulated with the aid of a plurality of sealing methods. For example, this may be carried out with the aid of a screwed connection and/or laser welding and/or embedding.

In particular, it is possible to exchange a battery and/or carry out possible maintenance of the electronics/sensor system in a safe/suitable environment (offsite). As a result, a high degree of robustness of the sensor system, i.e., the sensor device, is made possible or provided. This is in particular essential for a widespread and reliable application outside of closed buildings.

What is claimed is:

1. A sensor device, comprising:
   a sensor casing within which at least one sensor is situated; and
   a mounting fastened to a traffic infrastructure, the sensor casing being detachably fastened in the mounting,
   wherein the traffic infrastructure includes one of: (i) a road on which the mounting is fastened or (ii) a container warehouse within which the mounting is fastened.

2. The sensor device as recited in claim 1, wherein the mounting has exclusively a fastening functionality.

3. The sensor device as recited in claim 1, wherein in addition to a fastening functionality, the mounting has at least one additional functionality.

4. The sensor device as recited in claim 3, wherein the mounting includes a communication interface which is designed for transmitting sensor data of the at least one sensor via a communication network, so that the mounting has a communication functionality as an additional functionality.

5. A sensor device, comprising:
   a sensor casing within which at least one sensor is situated; and
   a mounting fastened to a traffic infrastructure, the sensor casing being detachably fastened in the mounting,
   wherein in addition to a fastening functionality, the mounting has at least one additional functionality,
   wherein the mounting includes a communication interface which is designed for transmitting sensor data of the at least one sensor via a communication network, so that the mounting has a communication functionality as an additional functionality,
   wherein the communication interface is designed for receiving the sensor data from the at least one sensor with the aid of at least one of an optical communication link and an electrical communication link.

6. The sensor device as recited in claim 3, wherein the mounting includes an electrical energy store for supplying the at least one sensor with electrical energy, so that the mounting has an energy supply functionality as an additional functionality.

7. The sensor device as recited in claim 3, wherein the mounting includes a data memory for storing sensor data of the at least one sensor and an electrical energy store for buffering the sensor data stored in the data memory, so that the mounting has a sensor data storage functionality and a sensor data buffer functionality as additional functionalities.

8. A sensor device, comprising:
   a sensor casing within which at least one sensor is situated; and
   a mounting fastened to a traffic infrastructure, the sensor casing being detachably fastened in the mounting,
   wherein in addition to a fastening functionality, the mounting has at least one additional functionality,
   wherein the mounting includes a detection device which is designed for detecting a number of sensor casing exchange cycles, so that the mounting has a sensor casing exchange cycle tracking functionality as an additional functionality.

9. The sensor device as recited in claim 3, wherein the mounting includes a processor which is designed for programming the at least one sensor, so that the mounting has a sensor programming functionality as an additional functionality.

10. The sensor device as recited in claim 1, wherein the sensor casing includes a communication interface, which is designed for transmitting sensor data from the at least one sensor via a communication network.

11. The sensor device as recited in claim 1, wherein at least one of the mounting and the sensor casing includes an energy transfer device for wireless transfer of electrical energy at least one of: (i) from the sensor casing to the mounting, and (ii) from the mouting to the sensor casing.

12. The sensor device as recited in claim 11, wherein the energy transfer device is a coil.

13. The sensor device as recited in claim 1, wherein at least one of the sensor casing and the mounting includes a processor designed for reading out an identification from at least one of the mounting and the sensor casing.

14. The sensor device as recited in claim 13, wherein the processor reads out the identification inductively with the aid of coils.

15. The sensor device as recited in claim 1, wherein the detachable fastening is formed with the aid of at least one of: (i) a bayonet joint, (ii) a screw connection, (iii) a catch mechanism, (iv) clipping, (v) an adhesive bonding, (vi) inserting the sensor casing into the mounting.

16. The sensor device as recited in claim 1, wherein the at least one sensor includes at least one of the following sensors: (i) a surroundings sensor, (ii) a parking sensor for detecting an occupancy state of a parking position, (iii) a traffic sensor for monitoring a traffic flow and/or for measuring a traffic density, and (iv) a warehouse sensor for monitoring a container assignment.

17. The sensor device as recited in claim 5, wherein the traffic infrastructure includes one of: (i) a parking facility within which the mounting is fastened, (ii) a road on which the mounting is fastened, or (iii) a container warehouse within which the mounting is fastened.

* * * * *